C. Avery,
Horse Power.

No 8,136. Patented June 3, 1851.

UNITED STATES PATENT OFFICE.

CYRUS AVERY, OF TUNKHANNOCK, PENNSYLVANIA.

HORSE-POWER.

Specification of Letters Patent No. 8,136, dated June 3, 1851.

*To all whom it may concern:*

Be it known that I, CYRUS AVERY, of Tunkhannock, in the county of Wyoming and State of Pennsylvania, have invented certain new and useful Improvements in the Endless-Platform Horse-Power; and I do hereby declare that the following is a full clear and exact description of the same, reference being had to the accompanying drawings, forming part of this specification, in which—

Figure 4:
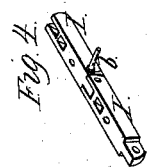
Figure 3:
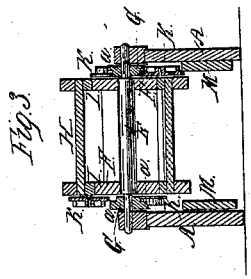
Figure 1:
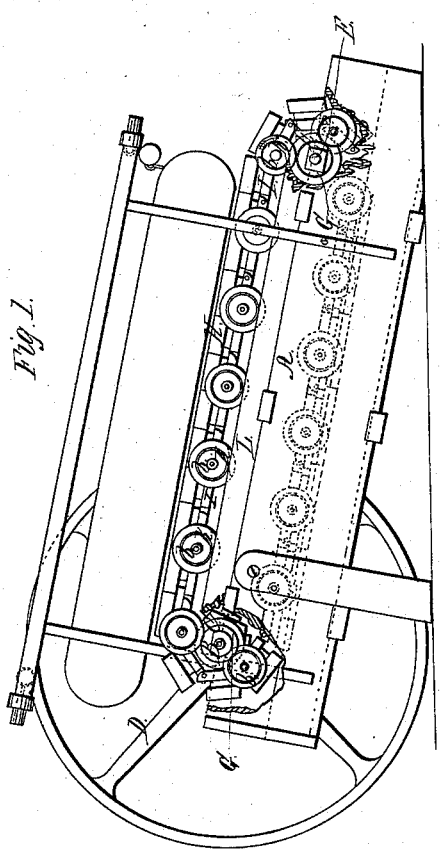
Figure 2:
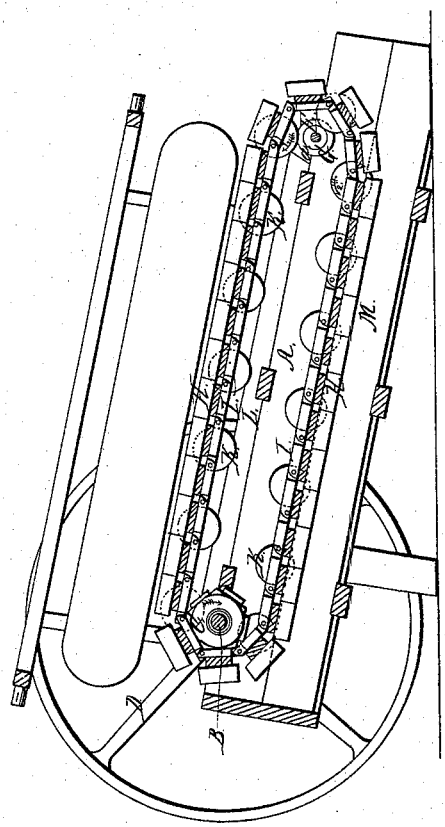

Figure 1, is a side elevation of the horse power, the frame being broken away around the axles to show the improved parts. Fig. 2, is a longitudinal vertical section of the same. Fig. 3, is a transverse section of the same. Fig. 4, is a perspective view of two of the links of the platform chain.

Similar letters of reference indicate corresponding parts in each of the several figures.

My improvements consist first in guiding the wheels of the endless platform, at the upper and lower ends or turning points of the chain, by means of loose flanged rollers upon the driving and guide shafts, whereby the friction caused by reversing the direction of the revolution of the wheels in the horse power now in use, is considerably diminished. Second in an improved mode of hanging the wheels on the endless chains of the platform.

To enable others skilled in the art to make and use my invention I will proceed to describe its construction and operation.

A, is the frame. B, is the main shaft hung in suitable bearings on the frame and having two toothed chain wheels C, C, and a fly wheel D, fast upon it.

E, is the lower guide shaft having two plain wheels F, F, fast upon it.

G, G, are rollers fitted so as to turn easily on the shafts B, and E, outside the wheels C, and F, close to the sides of the frame, they are provided with flanges a, on their outer edges nearest the frame.

H, is the platform which is secured in the common way to the links of the endless chains I, I, which have recesses on one side fitting to the teeth of the wheels C, C, on the driving shaft B, and also run on the plain wheels F, F, on the guide shaft E. The links I, I, of the endless chain are made of cast iron united by knuckle joints and in every alternate link a wrought iron pin b, is cast, standing out from the outside of the link the requisite distance to form the axle of one of the rollers K, which support the platform, thus the axles of the rollers form parts of the links.

L, are the top guide rails or ways on which the rollers K, K, on that part of the platform is above the shafts run. M, are the lower guide rails or ways on which the rollers on that part of the platform which is below the shafts run.

It will be understood that as the wheels K, K, during their course while the platform is in motion move from the upper guide rail L, to the lower one M, or vice versa the direction of their revolution must be reversed. The usual manner of guiding them around the shafts B, and E, is by means of curved stationary ways secured to the inside of the frame; as they travel round the ways their revolution is suddenly stopped and its direction reversed, and as they acquire a great impetus when in rapid motion, considerable power is lost in thus suddenly reversing them. This disadvantage I desire to overcome by the rollers G, G, on the flanges of which the wheels K, K, run as they pass round from one guide rail to the other, their flanges entering the recesses at the sides of the flanges a, a, on the rollers; as soon as a wheel comes in contact with one of the rollers its motion is transmitted to the roller which commences moving round the shaft on which it is mounted, the revolution of the wheel on its own axis stopping almost immediately, consequently when it reaches the opposite rail to that it has just left it will run freely. The rollers G, G, being flanged keep the wheels K, K, from slipping off their axles without the aid of linch pins or nuts. Great saving is effected in the construction as the weight of the roller is very small, whereas the ways usually employed are of considerable weight.

Considerable work is saved in making the chains I, I, by casting them with the wrought iron axles b, b, of the wheels K, K, on them, the axles being inserted in the mold and the metal poured around them.

What I claim as my invention and desire to secure by Letters Patent, is—

The employment of rollers G, G, mounted or hung on the main shaft B, and lower guide shaft F, in combination with the flanches on the wheels to retain said wheels upon their axles when passing from one platform to the other and to check their revolution as described.

CYRUS AVERY.

Witnesses:
R. R. LITTLE,
DANL. WEIGHT.